(12) United States Patent
Zeng et al.

(10) Patent No.: US 11,601,957 B2
(45) Date of Patent: Mar. 7, 2023

(54) DISTRIBUTED SCHEDULING TO CONTROL INTERFERENCE FOR DATA TRANSACTIONS USING GRANT-LESS TRANSMISSIONS

(71) Applicant: QUALCOMM Incorporated, San Diego, CA (US)

(72) Inventors: Wei Zeng, Saratoga, CA (US); Joseph Binamira Soriaga, San Diego, CA (US); Tingfang Ji, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 17/315,180

(22) Filed: May 7, 2021

(65) Prior Publication Data

US 2021/0266927 A1 Aug. 26, 2021

Related U.S. Application Data

(63) Continuation of application No. 14/926,065, filed on Oct. 29, 2015, now abandoned.
(Continued)

(51) Int. Cl.
*H04W 72/12* (2023.01)
*H04W 72/02* (2009.01)
(Continued)

(52) U.S. Cl.
CPC ......... *H04W 72/1231* (2013.01); *H04W 4/70* (2018.02); *H04W 52/262* (2013.01);
(Continued)

(58) Field of Classification Search
None
See application file for complete search history.

(56) References Cited

U.S. PATENT DOCUMENTS 7,372,898 B2 5/2008 Shin et al.
8,072,918 B2 12/2011 Muharemovic et al.
(Continued)

FOREIGN PATENT DOCUMENTS

CN 102484883 A 5/2012
CN 102860110 A 1/2013
(Continued)

OTHER PUBLICATIONS

Chinese Office Action for CN201680015170.4 dated Sep. 30, 2020. (The accompanying English translation was provided by the Chinese foreign associate and is submitted for the Examiner's reference.).
(Continued)

*Primary Examiner* — Christopher T Wyllie
(74) *Attorney, Agent, or Firm* — Qualcomm IP Dept.; James Hunt Yancey, Jr.

(57) ABSTRACT

Certain aspects of the present disclosure generally relate to techniques for distributed scheduling to control interference for small data transactions using grant-less transmissions. A method for wireless communications by wireless node is provided. The method generally includes receiving, from a base station, a list of supported modulation and coding schemes (MCS) and at least one parameter to control interference, determining a data rate and duration for a grant-less transmission based on the list of supported MCS and the at least one parameter, selecting access resources to use for the grant-less transmission from a common pool of resources configured to be shared by a plurality of wireless nodes for grant-less transmissions, and transmitting the
(Continued)

grant-less transmission using the selected access resources, at the determined data rate and for the determined duration.

30 Claims, 5 Drawing Sheets

Related U.S. Application Data (60) Provisional application No. 62/133,341, filed on Mar. 14, 2015.

(51) Int. Cl.
*H04W 72/04* (2023.01)
*H04W 52/26* (2009.01)
*H04W 4/70* (2018.01)

(52) U.S. Cl.
CPC ......... *H04W 72/02* (2013.01); *H04W 72/042* (2013.01); *H04W 72/048* (2013.01); *H04W 72/1257* (2013.01); *H04W 72/1289* (2013.01)

(56) References Cited

U.S. PATENT DOCUMENTS

| | | | |
|---|---|---|---|
| 8,515,466 B2 | 8/2013 | Zhang et al. | |
| 8,665,767 B2 | 3/2014 | Sampath et al. | |
| 8,964,721 B1* | 2/2015 | Liu | H04W 72/1257 370/327 |
| 2003/0142694 A1* | 7/2003 | Takano | H04L 1/0025 370/477 |
| 2004/0100941 A1 | 5/2004 | Lim et al. | |
| 2008/0012764 A1* | 1/2008 | Kang | H04B 7/0636 342/367 |
| 2008/0075109 A1 | 3/2008 | Zangi et al. | |
| 2009/0109931 A1* | 4/2009 | Yin | H04W 28/06 370/335 |
| 2009/0175243 A1 | 7/2009 | Han et al. | |
| 2009/0190561 A1 | 7/2009 | Yokoyama | |
| 2009/0213876 A1 | 8/2009 | Wang et al. | |
| 2009/0303937 A1 | 12/2009 | Sawahashi et al. | |
| 2010/0023830 A1 | 1/2010 | Wengerter et al. | |
| 2010/0254292 A1 | 10/2010 | Kim et al. | |
| 2010/0322096 A1 | 12/2010 | Hsu et al. | |
| 2011/0002293 A1* | 1/2011 | Yuk | H04W 72/0406 370/329 |
| 2011/0122805 A1* | 5/2011 | Abraham | H04W 72/0486 370/312 |
| 2011/0207410 A1 | 8/2011 | Gupta | |
| 2011/0249632 A1 | 10/2011 | Eriksson et al. | |
| 2011/0268045 A1 | 11/2011 | Heo et al. | |
| 2011/0292895 A1 | 12/2011 | Wager et al. | |
| 2012/0014269 A1 | 1/2012 | Ray et al. | |
| 2012/0044816 A1* | 2/2012 | Ratasuk | H04L 1/1874 370/252 |
| 2012/0044877 A1* | 2/2012 | Ratasuk | H04W 52/146 370/329 |
| 2012/0057499 A1 | 3/2012 | Pedersen et al. | |
| 2012/0087317 A1 | 4/2012 | Bostroem et al. | |
| 2013/0031002 A1 | 1/2013 | Hibbard | |
| 2013/0089047 A1* | 4/2013 | Wentink | H04W 74/06 370/329 |
| 2013/0229996 A1* | 9/2013 | Wang | H04L 1/0025 370/329 |
| 2014/0254544 A1* | 9/2014 | Kar Kin Au | H04L 1/1812 370/329 |
| 2014/0328155 A1* | 11/2014 | Dhanda | H04L 1/0003 370/215 |
| 2015/0023281 A1 | 1/2015 | Wu | |
| 2015/0030091 A1* | 1/2015 | El-Najjar | H04B 7/0691 375/267 |
| 2015/0139009 A1 | 5/2015 | Park et al. | |
| 2015/0139083 A1* | 5/2015 | Kneckt | H04W 74/0816 370/329 |
| 2015/0282203 A1* | 10/2015 | Liu | H04W 72/1236 370/329 |
| 2016/0028452 A1* | 1/2016 | Chu | H04B 7/0452 375/267 |
| 2016/0100408 A1* | 4/2016 | Hedayat | H04L 5/0037 370/329 |
| 2016/0270083 A1* | 9/2016 | Zeng | H04W 72/0486 |
| 2016/0270102 A1* | 9/2016 | Zeng | H04W 52/262 |
| 2016/0309427 A1* | 10/2016 | Cho | H04W 52/146 |
| 2016/0353436 A1 | 12/2016 | Au et al. | |
| 2017/0164390 A1* | 6/2017 | Zeng | H04W 72/0446 |
| 2017/0290008 A1* | 10/2017 | Tooher | H04W 72/0446 |
| 2018/0092125 A1* | 3/2018 | Sun | H04W 74/02 |
| 2018/0227957 A1* | 8/2018 | Lou | H04W 74/0816 |
| 2018/0249491 A1* | 8/2018 | Au | H04W 72/02 |
| 2020/0029283 A1* | 1/2020 | Lei | H04W 52/10 |

FOREIGN PATENT DOCUMENTS

| | | |
|---|---|---|
| CN | 103069906 A | 4/2013 |
| JP | 2013516944 A | 5/2013 |
| WO | 2010010818 A1 | 1/2010 |
| WO | 2011025842 | 3/2011 |
| WO | 2011060309 | 5/2011 |
| WO | 2011085403 A1 | 7/2011 |
| WO | 2014114354 A1 | 7/2014 |
| WO | 2014135126 A1 | 9/2014 |

OTHER PUBLICATIONS

Chinese Office Action for CN201680015170.4 dated Feb. 21, 2020. (The accompanying English translation was provided by the Chinese foreign associate and is submitted for the Examiner's reference.).
3rd Generation Partnership Project; Technical Specification Group Radio Access Network; Evolved Universal Terrestrial Radio Access (E-UTRA); Physical layer procedures (Release 9), 3GPP Draft; 3GPP TS 36.213, V9.2.0, 3rd Generation Partnership Project (3GPP), Mobile Competence Centre ; 650, Route Des Lucioles; F-06921 Sophia-Antipolis Cedex ; France, val. RAN WG1, No. Madrid, Spain; Aug. 27, 2010, [retrieved on Aug. 27, 2010], 80 pages.
International Preliminary Report on Patentability—PCT/US2016/018066, The International Bureau of WIPO—Geneva, Switzerland, dated May 17, 2017.
International Search Report and Written Opinion—PCT/US2016/018066—ISA/EPO—dated May 12, 2016.

* cited by examiner

FIG. 6 ly related to methods and apparatus for distributed scheduling to control interference for data transactions using grant-less transmissions. In some scenarios, the data transactions may involve small amounts of data (e.g., on the order of a few bytes to a few hundred bytes). Also, in some scenarios, the data communication instances may happen on relatively longer frequencies, such as a few times a day, week, or month, or other occasions smaller than an always-connected type of connection.

DISTRIBUTED SCHEDULING TO CONTROL INTERFERENCE FOR DATA TRANSACTIONS USING GRANT-LESS TRANSMISSIONS

CROSS-REFERENCE TO RELATED APPLICATION & PRIORITY CLAIM

This application is a continuation of U.S. patent application Ser. No. 14/926,065, filed Oct. 29, 2015, which claims benefit of and priority to U.S. Provisional Patent Application Ser. No. 62/133,341, filed Mar. 14, 2015, both of which are herein incorporated by reference in their entireties for all applicable purposes.

TECHNICAL FIELD

Certain aspects of the present disclosure generally relate to methods and apparatus for distributed scheduling to control interference for small data transactions using grant-less transmissions. Certain embodiments can enable and provide wireless communication devices that efficiently use power resources, limit network interference, sustain appropriate user experience behavior, and support many numbers of wireless devices in a communications network paradigm.

INTRODUCTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3$^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless nodes. Each node communicates with one or more base stations via transmissions on forward and reverse links. The forward link (or downlink) refers to a communication link from base stations to nodes, and a reverse link (or uplink) refers to a communication link from nodes to base stations. Communication links may be established via a single-input single-output, multiple-input single-output, or a multiple-input multiple-output (MIMO) system.

Certain types of devices, such as machine-type communications (MTC) devices or Internet-of-Everything (IoE) devices, may have a small amount of data to send and may send data relatively infrequently (e.g, several times daily, weekly, monthly, or on other occasions). So in some scenarios, the amount of overhead necessary to establish a network connection may by high relative to the amount of data sent/received during active communication states and/ or the frequency of data transmissions.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure general

Certain aspects of the present disclosure provide a method for wireless communications by a wireless node. The method generally includes receiving, from a base station, a list of supported modulation and coding schemes (MCS) and at least one parameter to control interference, determining a data rate and duration for a grant-less transmission based on the list of supported MCS and the at least one parameter, selecting access resources to use for the grant-less transmission from a common pool of resources configured to be shared by a plurality of wireless nodes for grant-less transmissions, and transmitting the grant-less transmission using the selected access resources, at the determined data rate and for the determined duration.

Certain aspects of the present disclosure provide an apparatus for wireless communications by a wireless node. The apparatus generally includes a receiver configured to receive, from a base station, a list of supported MCS and at least one parameter to control interference; at least one processor configured to determine a data rate and duration for a grant-less transmission based on the list of supported MCS and the at least one parameter, and select access resources to use for the grant-less transmission from a common pool of resources configured to be shared by a plurality of wireless nodes for grant-less transmissions; and a transmitter configured to transmit the grant-less transmission using the selected access resources, at the determined data rate and for the determined duration.

Certain aspects of the present disclosure provide an apparatus for wireless communications by a wireless node. The apparatus generally includes means for receiving, from a base station, a list of supported MCS and at least one parameter to control interference, means for determining a data rate and duration for a grant-less transmission based on the list of supported MCS and the at least one parameter, means for selecting access resources to use for the grant-less transmission from a common pool of resources configured to be shared by a plurality of wireless nodes for grant-less transmissions, and means for transmitting the grant-less transmission using the selected access resources, at the determined data rate and for the determined duration.

Certain aspects of the present disclosure provide a computer readable medium. The computer readable medium generally includes computer executable code stored thereon for: receiving, from a base station, a list of supported MCS and at least one parameter to control interference, determining a data rate and duration for a grant-less transmission based on the list of supported MCS and the at least one parameter, selecting access resources to use for the grant-less transmission from a common pool of resources configured to be shared by a plurality of wireless nodes for grant-less transmissions, and transmitting the grant-less transmission using the selected access resources, at the determined data rate and for the determined duration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Aspects of the present disclosure provide techniques for distributed scheduling to control interference for small data transactions using grant-less transmissions (e.g., connectionless access) by a wireless node (e.g., an Internet-of-Everything (IoE) device). As will be described in greater detail below, grant-less transmissions may allow for data transmission without or reduced overhead associated with establishing conventional connected access to a network. As a result, a device with relatively little data to transmit, such as an IoE device, can efficiently exit an idle mode, transmit data during a connectionless access, and return to idle mode. According to certain aspects, the wireless node may determine a data rate and a duration for a grant-less transmission. The wireless node may randomly select access resources to use for the grant-less transmission from a common pool of resources. The common pool of resources can be shared by a plurality of wireless nodes for grant-less transmissions and can be finite in some scenarios. The wireless node can perform a grant-less transmission using the randomly selected access resources, at the determined data rate and for the determined duration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink (UL) communications where lower PAPR greatly benefits the wireless node in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), medical devices or equipment, biometric sensors/devices, an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

An Example Wireless Communication System

Figure 1:
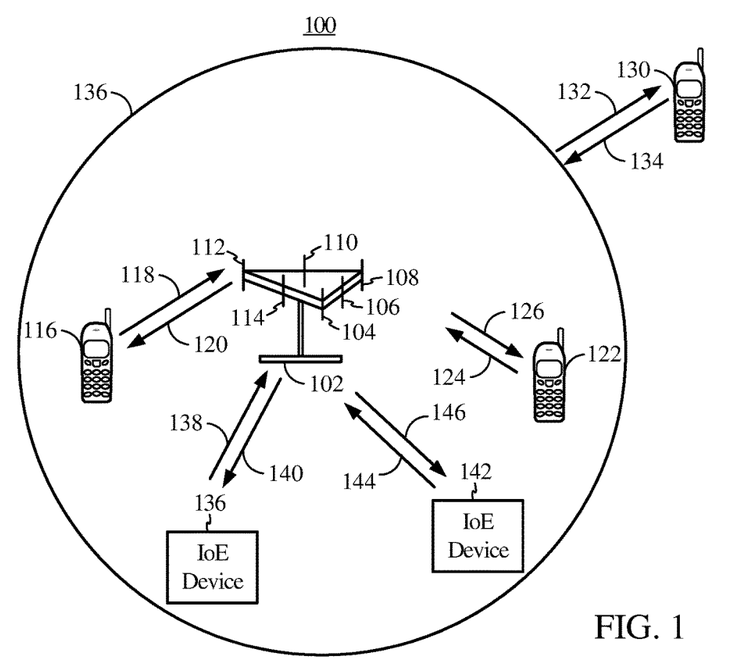
FIG. 1 illustrates an example multiple access wireless communication system, in accordance with certain aspects of the present disclosure.

FIG. 1 illustrates an example communications network 100 in which aspects of the present disclosure may be performed. For example, IoE device 136 may determine a data rate for grant-less transmission to base station 102. The data rate may be selected based on a received list of modulation and coding schemes (MCS) supported by the BS 102. IoE device 136 may determine a duration for the grant-less transmission at the selected data rate (e.g., the associated duration for each MCS may also be received from BS 102). The IoE device 136 may select (randomly in some embodiments and scenarios), from a common pool of resources shared by a plurality of wireless nodes (e.g., IoE device 142 and wireless nodes 116 and 122) access resources to use for the grant-less transmission and perform the grant-less transmission using the access resources at the determined data rate for the determined duration.

Referring to FIG. 1, a multiple access wireless communication system 100 according to one aspect is illustrated. A base station (BS) 102 may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Wireless node 116 may be in communication with antennas 112 and 114, where antennas 112 and 114 transmit information to wireless node 116 over forward link 120 and receive information from wireless node 116 over reverse link 118. Wireless node 122 may be in communication with antennas 106 and 108, where antennas 106 and 108 transmit information to wireless node 122 over forward link 126 and receive information from wireless node 122 over reverse link 124. The BS 102 may also be in communication with other wireless nodes, which may be, for example, Internet-of-Everything (IoE) devices. IoE device 136 may be in communication with one or more other antennas of BS 102, where the antennas transmit information to IoE device 136 over forward link 140 and receive information from IoE device 136 over reverse link 138. IoE device 142 may be in communication with one or more other antennas of BS 102, where the antennas transmit information to IoE device 142 over forward link 146 and receive information from IoE device 142 over reverse link 144. In a Frequency Division Duplex (FDD) system, communication links 118, 120, 124, 126, 138, 140, 144, and 146 may use different frequency for communication. For example, forward link 120 may use a different frequency than that used by reverse link 118, and forward link 140 may use a different frequency than that used by reverse link 138.

Each group of antennas and/or the area in which they are designed to communicate is often referred to as a sector of the BS. In one aspect of the present disclosure, each antenna group may be designed to communicate to wireless nodes in a sector of the areas covered by access point 102.

Wireless node 130 may be in communication with BS 102, where antennas from the BS 102 transmit information to wireless node 130 over forward link 132 and receive information from the wireless node 130 over reverse link 134.

In communication over forward links 120 and 126, the transmitting antennas of BS 102 may utilize beamforming in order to improve the signal-to-noise ratio of forward links for the different wireless nodes 116, 122, 136, and 142. Also, a BS using beamforming to transmit to wireless nodes scattered randomly through its coverage causes less interference to wireless nodes in neighboring cells than a BS transmitting through a single antenna to all its wireless nodes.

Figure 2:
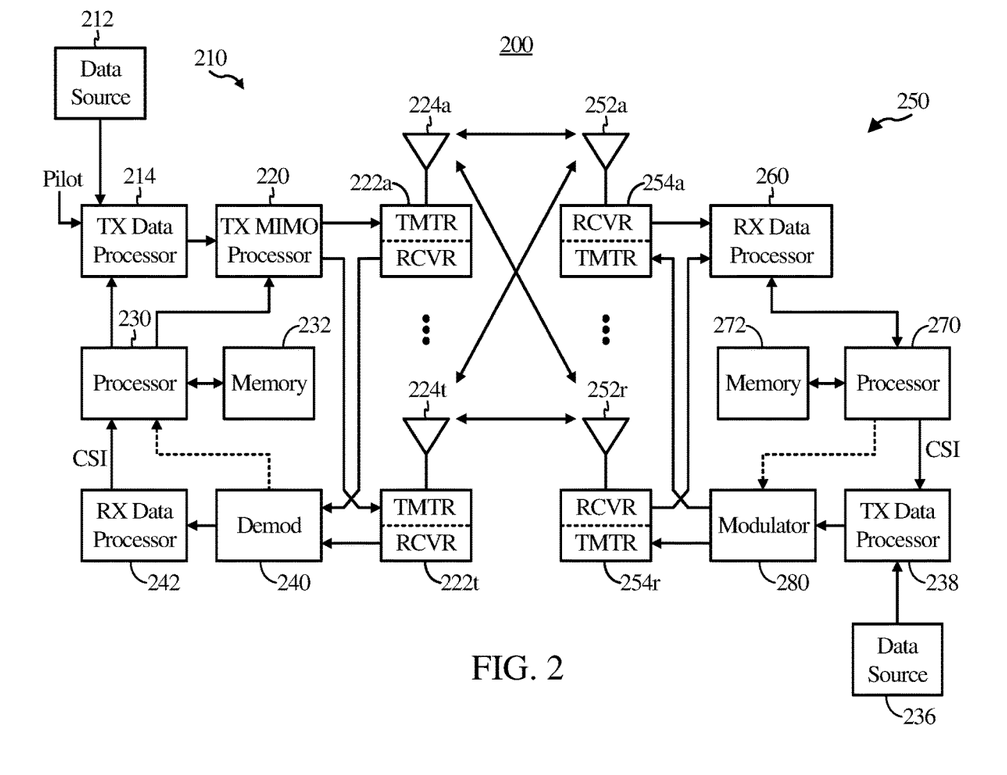
FIG. 2 illustrates a block diagram of a base station and a wireless node, in accordance with certain aspects of the present disclosure.

FIG. 2 illustrates a block diagram of an aspect of a transmitter system 210 (e.g., also known as the base station) and a receiver system 250 (e.g., also known as the wireless node) in a multiple-input multiple-output (MIMO) system 200. Each of system 210 and system 250 has capabilities to both transmit and receive. Whether system 210 or system 250 is transmitting, receiving, or transmitting and receiving simultaneously depends on the application. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software/firmware for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software/firmware for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Any one of the processor 270, RX data processor 260, TX data processor 238, or other processors/elements, or a combination thereof of the wireless node 250 and/or any one of the processor 230, TX MIMO processor 220, TX data processor 214, RX data processor 242, or other processors/elements, or a combination thereof of the access point 210 may be configured to perform the procedures for connectionless access in accordance with certain aspects of the present disclosure discussed below. In an aspect, at least one of the processor 270, RX data processor 260, and TX data processor 238 may be configured to execute algorithms stored in memory 272 for performing the random-access channel (RACH) procedures for connectionless access described herein. In another aspect, at least one of the processor 230, TX MIMO processor 220, TX data processor 214, and RX data processor 242 may be configured to execute algorithms stored in memory 232 for performing the RACH procedures for connectionless access described herein.

Figure 3:
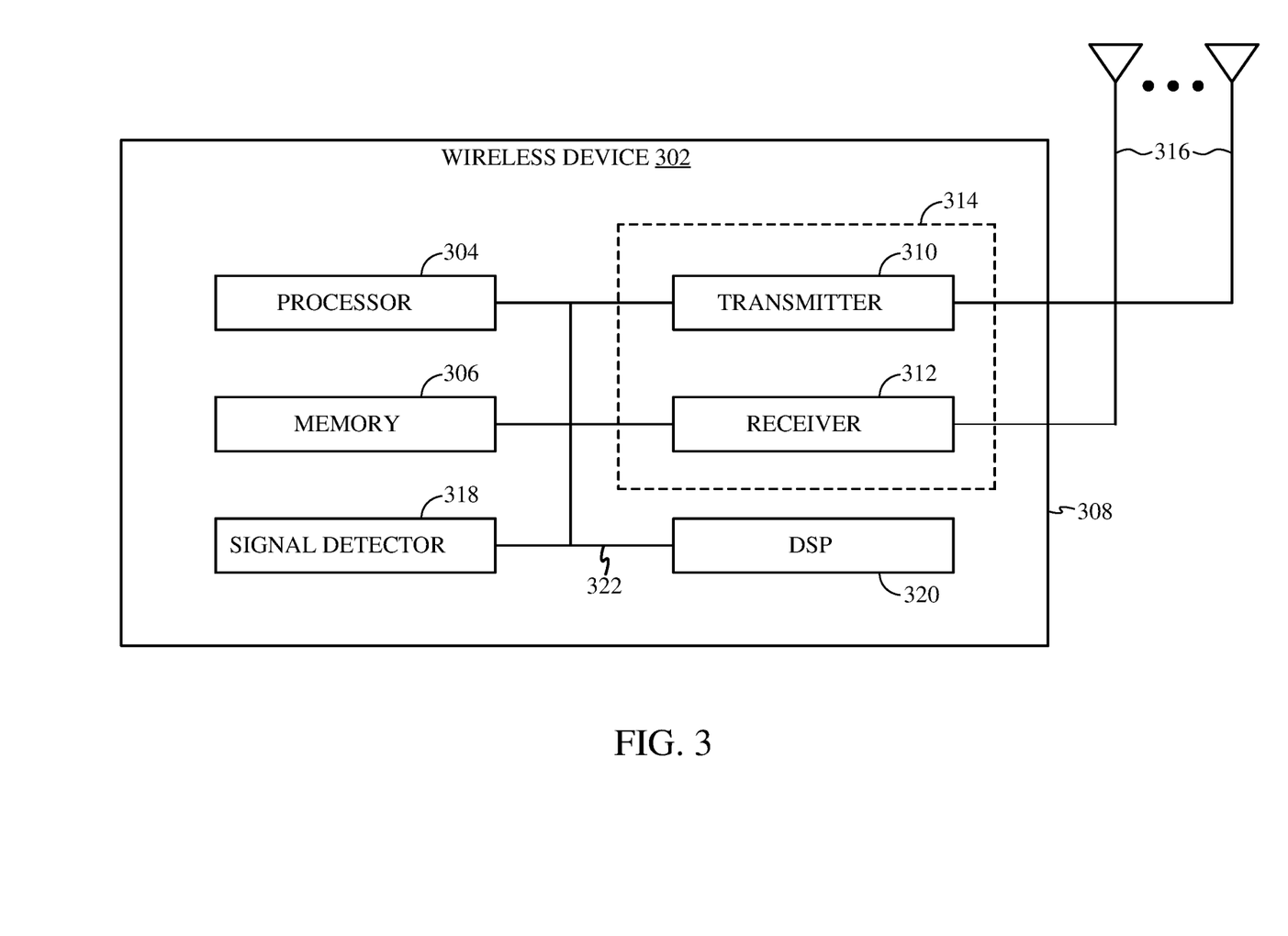
FIG. 3 illustrates various components that may be utilized in a wireless device, in accordance with certain aspects of the present disclosure.

FIG. 3 illustrates various components that may be utilized in a wireless device 302 that may be employed within the wireless communication system 100 illustrated in FIG. 1. The wireless device 302 is an example of a device that may be configured to implement the various methods described herein. The wireless device 302 may be a base station 102 or any of the wireless nodes (e.g., 116, 122, 136, and 142). For example, the wireless device 302 may be configured to perform operations 500 described in FIG. 5 (as well as other operations described herein).

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, to allow a UE to transmit data efficiently during a connectionless access. Some non-limiting examples of the processor 304 may include Snapdragon processor, application specific integrated circuits (ASICs), programmable logic, etc.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers. The wireless device 302 can also include wireless battery charging equipment.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus. The processor 304 may be configured to access instructions stored in the memory 306 to perform connectionless access, in accordance with aspects of the present disclosure discussed below.

Distributed Scheduling to Control Interference for Small Data Transactions Using Grant-Less Transmissions Generally, cellular networks may require devices to perform a lengthy signaling procedure (e.g., a random access channel (RACH) procedure) to establish a radio link connection with the network before the devices can transmit any data. For example, the procedure may include sending a request for resources and receiving a resource assignment or grant from the network. Sometimes, this is generally referred to as call set up. Radio link establishment creates overhead traffic.

Certain types of devices (e.g., machine-type communications (MTC) devices or Internet-of-Everything (IoE) devices) may have only a small amount of data to send through the cellular network, and may send that data relatively infrequently. In such cases, the amount of overhead necessary to establish a network connection may by very high relative to the actual data sent during the connection. Examples of these types of devices include, but are not limited to, smart meters, smart sensors, and environment monitoring devices, which may be battery operated and designed to maximize battery life (e.g., to last on the order of years). Some networks may support a large number of these devices.

For such devices, it may be more energy efficient for these devices to begin transmission without waiting for the network to assign resources. Connections of this type can be referred to as grantless connections since a network has not granted resources for wireless device to use for a radio link connection. As one example, a grantless connection can be established without performing a RACH procedure and without requesting resources. Also, this may be done through grant-less transmission using non-orthogonal waveforms. For example, the device may randomly select from a common pool of access resources for grant-less transmissions. The base station monitors the common pool of access resources for new connections, such as transmissions from remote wireless devices. Each access resource may include a pair of a scrambling code or interleaver and an access time. A grant-less transmission from the device may include data and an identification specific to the device (e.g., for a user equipment (UE), a UE ID). The transmission may include overhead to demodulate data.

Figure 4:
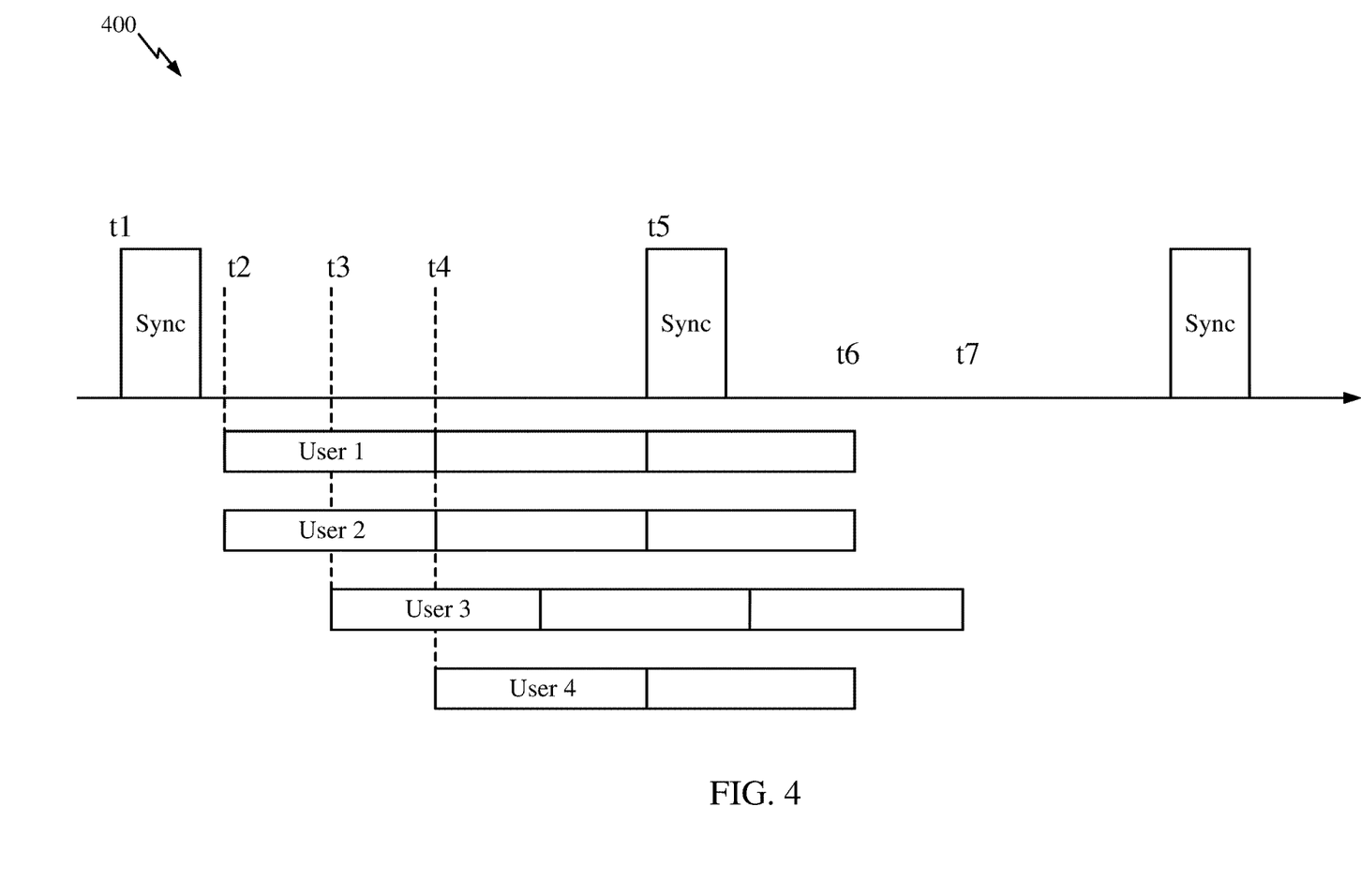
FIG. 4 illustrates an example timeline for interfering grant-less transmissions by a plurality of wireless nodes, in accordance with certain aspects of the present disclosure.

FIG. 4 illustrates an example timeline for interfering grant-less transmissions by a plurality of wireless nodes (user 1, user 2, user 3, and user 4), in accordance with certain aspects of the present disclosure. As shown in FIG. 4, at t1, a device may wake-up and synchronize to a cell or base station (e.g., receive a downlink synchronization signal from a base station) and then begin a grant-less transmission using the randomly selected resources. As shown in FIG. 4, grant-less transmissions from the multiple devices (e.g., users 1-4) may interfere. For example, user 1 and user 2 may both perform grant-less transmission during t2 to t6, user 3 may perform grant-less transmission during t3 to t7, and user 4 may perform grant-less transmission from t4 to t5. Thus, during t2-t7, at least two, and up to all four of the devices may transmitting signals to the base station concurrently.

With non-orthogonal multiple access, concurrent devices' transmitted signals may show up as intra-cell interference to each other. Each device's signal contributes to the overall rise-over-thermal (ROT) at the base station. The ROT may also determine interference to each device's signal. The devices may adopt open loop power control (OLPC) to determine a transmitted power level based on observations of downlink signal strength. Different devices may suffer different path-loss to the base station and, therefore, the different devices may support different data rates. For example, devices with small path-loss may support transmission at higher rates, whereas device with large path-loss may support transmission at lower rates.

Accordingly, techniques for controlling interference for small data transactions using grant-less transmissions may be desirable. Aspects of the present disclosure provide for distributed scheduling to control interference for small data transactions using grant-less transmissions.

Figure 5:
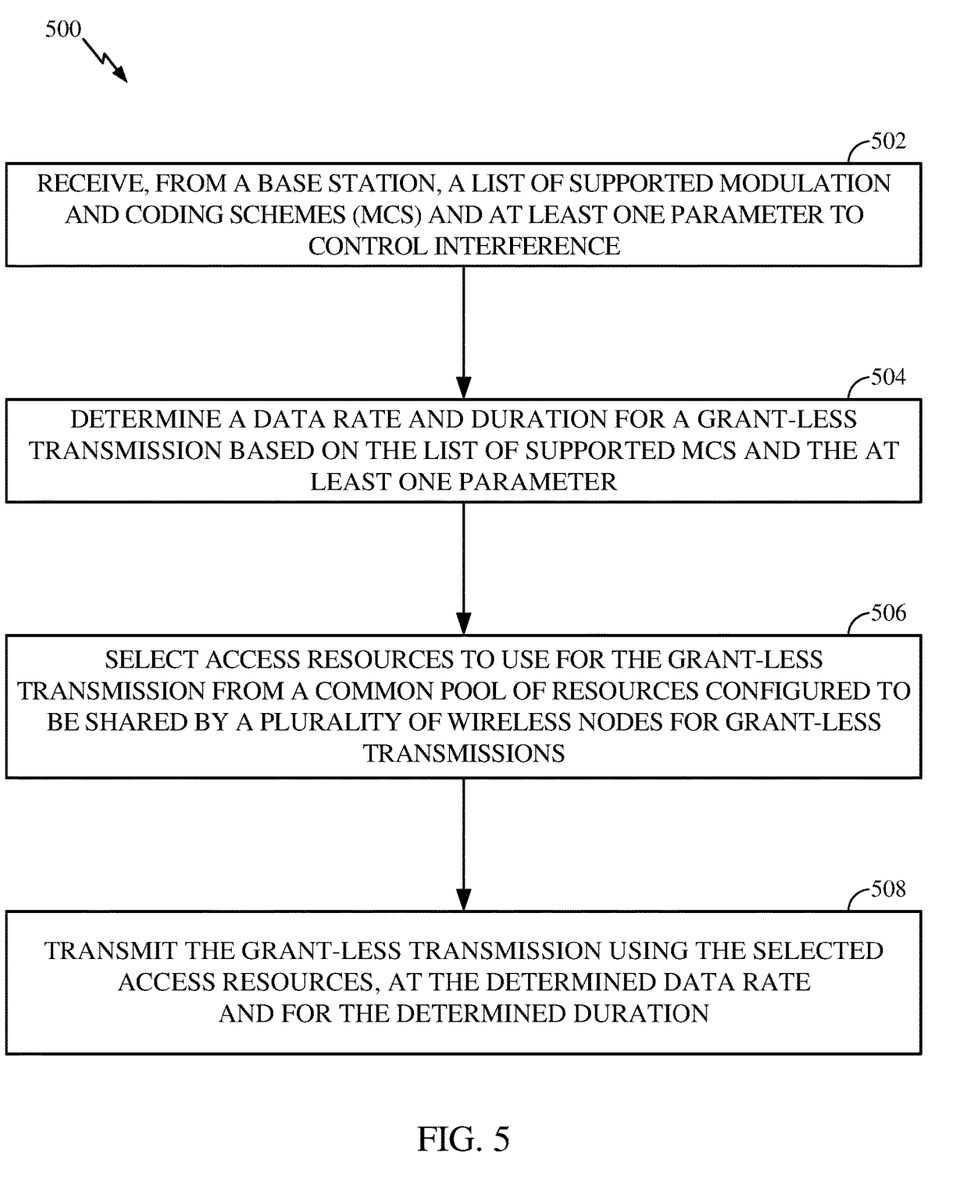
FIG. 5 is a flow diagram illustrating example operations for grant-less transmissions that can be performed by a wireless node, in accordance with certain aspects of the present disclosure.

FIG. 5 illustrates example operations 500 for wireless communication, in accordance with certain aspects of the present disclosure. Operations 500 may be performed, for example, by a wireless node (e.g., IoE device 136 of FIG. 1), for grant-less transmissions. The wireless node may use grant-less connections with network-side components (e.g., base stations, eNBs, etc.) as well as non-network-side components (e.g. remote wireless devices) in a mesh or P2P configuration.

Operations 500 may begin, at 502, by receiving (e.g., in a system information block (SIB)), from a base station, a list of support MCS and at least one parameter to control inference. At 504, the wireless node determines a data rate and duration for a grant-less transmission based on the list of supported MCS and the at least one parameter. At 506, the wireless node may select access resources (e.g., a scrambling code or an interleaver, an access time, and/or a wireless channel) to use for the grant-less transmission from a common pool of resources configured to be shared by a plurality of wireless nodes for grant-less transmissions. At 508, the wireless node may transmit the grant-less transmission using the selected access resources, at the determined data rate and for the determined duration. According to certain aspects, the grant-less transmission may include data and a device specific identification of the wireless node.

According to certain aspects, the at least one parameter to control interference may indicate a maximum transmission time constraint or size constraint for a device to perform grant-less transmission. The wireless node may measure a pathloss between the wireless node and the base station and determine a transmission power for the grant-less transmission based on the path-loss measurement.

Example Maximum Grant-less Transmission Time Constraint

For a subset of MCS that may use a high signal to noise ratio (SNR) to decode successfully, the base station may send extra information to constrain the maximum number of subframes for which devices can use that MCS without requesting a grant (e.g., a maximum grant-less transmission time constraint). The wireless node may then calculate a transmission power associated with each of the supported MCSs (e.g., based on synchronization channel strength) in the received list.

According to certain aspects, the determining of the data rate at 504 may include selecting, by the wireless node, an MCS, from the list of supported MCSs, that is not associated with a transmission power that exceeds the determined transmission power for the grant-less transmission. According to certain aspects, the determining of the duration for the grant-less transmission at 504, may be based on the extra information received from the base station along with the list of supported MCSs. For example, the wireless node may receive the indication of a maximum duration (e.g., a number of subframes) for grant-less transmission associated with an MCS corresponding to a high data rate.

According to certain aspects, the wireless node may not complete the grant-less transmission within the selected duration. In this case, the wireless node may perform a random backoff (e.g., wait for a random number of subframes) before starting another grant-less transmission to continue sending the remaining data. A parameter for the random backoff may be specified by the base station (e.g., in the extra information).

Example Per-Grant-less Transmission or Per-MCS Payload Size Constraint

Additionally or alternatively, the extra information sent by the base station to the wireless node, along with the list of supported MCS, may include an indication of a maximum payload size for grant-less transmission (e.g., a maximum number of bits that a device can send per transaction without requesting for a grant). The maximum payload size can be regardless of the selected MCS. Alternatively, the maximum payload size can be indicated for each MCS.

As discussed above, the wireless node may calculate a transmission power associated with each of the supported MCSs (e.g., based on sync channel strength) in the received list of MCSs and select an MCS, from the list of supported MCSs, that is not associated with a transmission power that exceeds the determined transmission power for the grant-less transmission. According to certain aspects, The determination of the duration for the grant-less transmission (e.g., at the selected data rate), at step 504, may be based on the maximum payload size.

Once the wireless node sends the allowed number of bits, the wireless node may perform a random backoff (e.g., wait for a random number of subframes) before starting another grant-less transmission to continue sending the remaining data. A parameter for the random backoff may be specified by the base station (e.g., in the extra information).

Example Grant-Less Transmission Using Multiple Carriers

According to certain aspects, if the wireless node has enough power headroom to support transmissions over multiple carriers, the wireless node may perform the grant-less transmission over multiple carriers (e.g., large bandwidth). Transmission over multiple carriers may boost or increase the effective transmission rate. In this case, the access resources, data rate, and duration may be determined for each carrier. In an example implementation, the wireless node may be allowed to transmit a maximum payload size of 1000 bits per carrier for each uplink transaction without requesting a grant; however, the wireless node may have a payload of 2000 bits to send. The wireless node may have enough power headroom to support 100 kbps per 1 MHz carrier on two carriers (which may correspond to 11.7 dB EcNt per receiver antenna per carrier). In this case, the wireless node may simultaneously transmit on two carriers at 100 kbps and finish transmission within 10 ms, instead of transmitting twice on one carrier, with a random backoff in between the transmissions.

According to certain aspects, the wireless node may receive RoT feedback information (e.g., the RoT indicator bit) from the base station and may optimize the rate and duration selecting using RoT feedback information.

According to certain aspects, by employing the distributed scheduling techniques discussed above for small data transactions using grant-less transmissions, multiple devices may be able transmit at a high data rate, with small total interference, by limiting the transaction time at high data rate.

Figure 6:
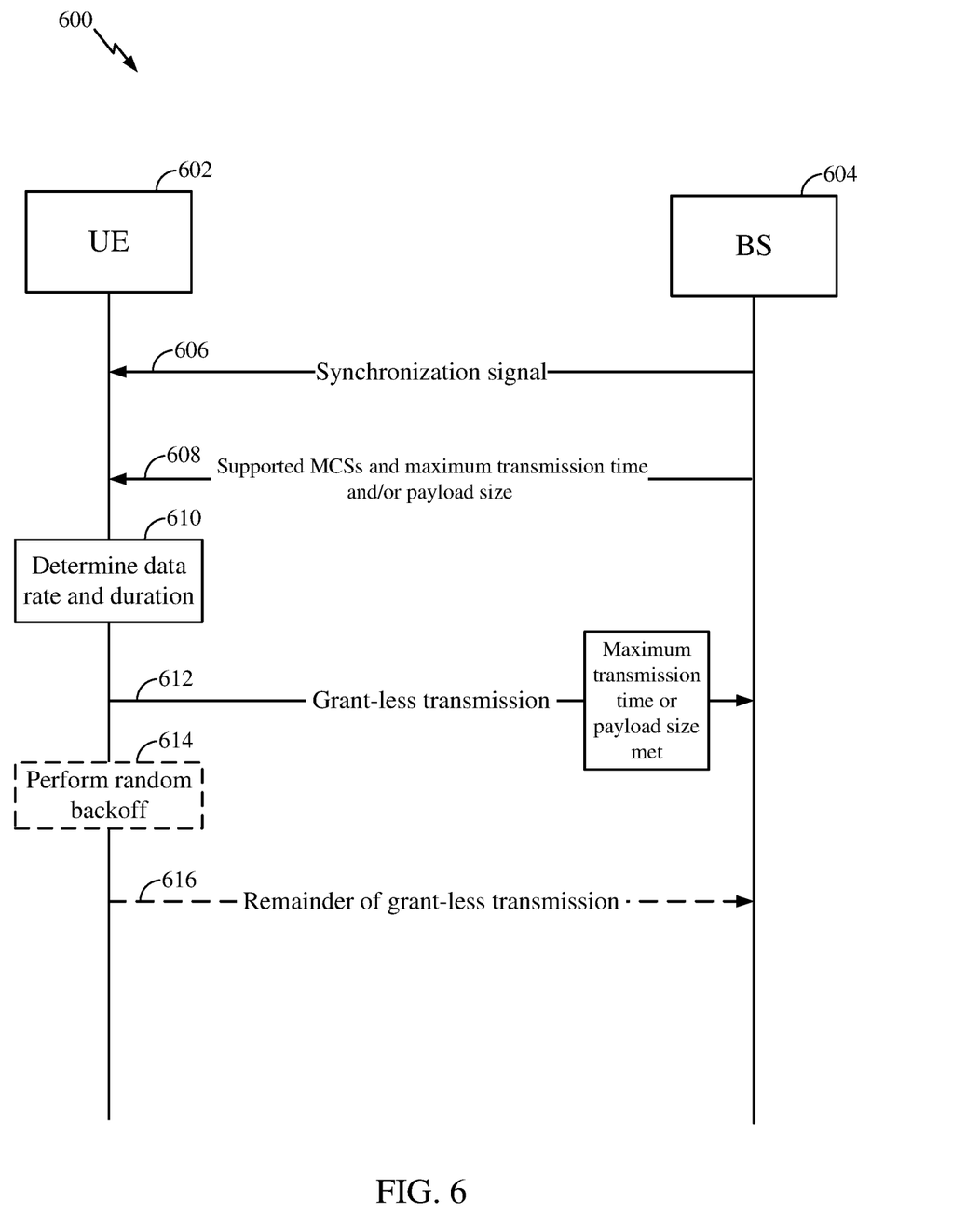
FIG. 6 is an example call flow for grant-less transmission that can be performed by a wireless node, in accordance with certain aspects of the present disclosure.

FIG. 6 is an example call flow 600 illustrating interaction between the wireless node and base station for the operations 500 grant-less transmission, in accordance with certain aspects of the present disclosure. As shown in FIG. 6, at 606, the UE 602 may synchronize with the BS 604. At 608, the UE 602 may receive a list of supported MCSs and extra information (e.g., maximum grant-less transmission time constraint, maximum payload size constraint per-grant-less transmission and/or per MCS) from the BS 604.

At 610, the UE 602 may determine a data rate and duration for a grant-less transmission (e.g., based on the list of supported MCSs and the extra information), for example, corresponding to steps 502 and 504 of operations 500. Then, at 612, the UE 602 may perform the grant-less transmission at the determined data rate for the determined duration, for example, corresponding to step 508 of operations 500.

If the grant-less transmission is not finished during the duration or if the maximum payload is reached, the UE 602 may perform a random backoff 614 (e.g., wait for a number of subframes specified by the BS 604) before sending another grant-less transmission at 616.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for receiving, from a base station, a list of supported MCS and at least one parameter to control infereference may comprise a receiver (e.g., the receiver unit of transceiver(s) 254a-254r) and/or an antenna(s) 252a-252r of the wireless node 250 illustrated in FIG. 2 or the receiver (e.g., the receiver unit of transceiver(s) 222a-222t) and/or antenna(s) 224a-224t of base station 210 illustrated in FIG. 2. Means for transmitting the grant-less transmissions using the selected access resources, at the determined data rate and for the determined duration may be a transmitter (e.g., the transmitter unit of transceiver(s) 254a-254r) and/or an antenna(s) 252a-252r of the wireless node 250 illustrated in FIG. 2 or the transmitter (e.g., the transmitter unit of transceiver(s) 222a-222t) and/or antenna(s) 224a-224t of base station 210 illustrated in FIG. 2.

Means for determining a data rate and duration for a grant-less transmission based on the list of supported MCS and the at least one parameter and means for randomly selecting access resources to use for the grant-less transmission from a common pool of resources configured to be shared by a plurality of wireless node for grant-less transmissions may comprise a processing system, which may include one or more processors, such as the RX data processor 260, the TX data processor 238, and/or the processor 270 of the wireless node 250 illustrated in FIG. 2 or the TX data processor 214, RX data processor 242, and/or the processor 230 of the base station 210 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for determining a data rate for a grant-less transmission, an algorithm for determining a duration for the grant-less transmission at the determined data rate, an algorithm for randomly selecting access resources to use for the grant-less transmission from a common pool of resources shared by a plurality of wireless nodes for grant-less transmissions, and an algorithm for performing the grant-less transmission using the randomly selected access resources, at the determined data rate and for the determined duration.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a data rate for a grant-less transmission, instructions for determining a duration for the grant-less transmission at the determined data rate, instructions for randomly selecting access resources to use for the grant-less transmission from a common pool of resources shared by a plurality of wireless nodes for grant-less transmissions, and instructions for performing the grant-less transmission using the randomly selected access resources, at the determined data rate and for the determined duration.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless node, comprising:
   receiving, from a base station, a plurality of modulation and coding schemes (MCS) and, for each MCS, a maximum duration constraint or a maximum payload size constraint for grant-less transmission using MCS;
   determining a data rate and duration for a grant-less transmission based on a selected MCS from the plurality of MCS and the maximum duration constraint or the maximum payload size constraint associated with the selected MCS;
   selecting access resources to use for the grant-less transmission from a common pool of resources configured to be shared by a plurality of wireless nodes for grant-less transmissions;
   transmitting a first portion of the grant-less transmission using the selected access resources, at the determined data rate and for the determined duration; and
   when the maximum duration constraint or the maximum payload size constraint is reached, requesting a grant for transmitting a second portion of the grant-less transmission.

2. The method of claim 1, wherein determining the data rate comprises:
   calculating a transmission power associated with each of one or more of the MCS; and
   selecting an MCS that is associated with a calculated transmission power that does not exceed a transmission power used for the grant-less transmission.

3. The method of claim 1, wherein:
   determining the duration for the grant-less transmission comprises selecting a duration for the grant-less transmission that does not exceed the indicated maximum duration constraint for grant-less transmission associated with the selected MCS.

4. The method of claim 1, wherein:
   determining the duration for the grant-less transmission comprises determining a duration corresponding to a payload size that does not exceed the indicated maximum payload size constraint for the grant-less transmission using the selected MCS.

5. The method of claim 1, wherein:
   the grant-less transmission is transmitted using multiple component carriers (CCs); and
   the data rate and the duration for the grant-less transmission are determined per-CC.

6. The method of claim 5, wherein transmitting the grant-less transmission over multiple carriers comprises:
- transmitting a third portion of the grant-less transmission on a first CC using a first determined data rate and a first determined duration, and
- transmitting a fourth portion of the grant-less transmission on a second CC using a second determined data rate and a second determined duration.

7. The method of claim 1, wherein the grant-less transmission is transmitted using a single component carrier (CC).

8. The method of claim 1, wherein the access resources comprise a scrambling code or an interleaver and access time.

9. The method of claim 1, further comprising including an identification of the wireless node with the grant-less transmission.

10. An apparatus for wireless communications by a wireless node, comprising:
- a receiver configured to receive, from a base station, a plurality of modulation and coding schemes (MCS) and, for each MCS, a maximum duration constraint or a maximum payload size constraint for grant-less transmission using the MCS;
- at least one processor configured to:
  - determine a data rate and duration for a grant-less transmission based on a selected MCS from the plurality of MCS and the maximum duration constraint or the maximum payload size constraint associated with the selected MCS, and
  - select access resources to use for the grant-less transmission from a common pool of resources configured to be shared by a plurality of wireless nodes for grant-less transmissions; and
- a transmitter configured to:
  - transmit a first portion of the grant-less transmission using the selected access resources, at the determined data rate and for the determined duration; and
  - when the maximum duration constraint or the maximum payload size constraint is reached, request a grant for transmitting a second portion of the grant-less transmission.

11. The apparatus of claim 10, wherein the at least one processor is configured to determine the data rate by:
- calculating a transmission power associated with each of one or more of the MCS; and
- selecting an MCS that is associated with a calculated transmission power that does not exceed a transmission power used for the grant-less transmission.

12. The apparatus of claim 10, wherein:
the at least one processor is configured to determine the duration for the grant-less transmission by selecting a duration for the grant-less transmission that does not exceed the indicated maximum duration constraint for grant-less transmission associated with the selected MCS.

13. The apparatus of claim 10, wherein:
for the grant-less transmission by determining a duration corresponding to a payload size that does not exceed the indicated maximum payload size constraint for the grant-less transmission using the selected MCS.

14. The apparatus of claim 10, wherein:
the transmitter is configured to transmit the grant-less transmission using multiple component carriers (CCs); and
the at least one processor is configured to determine the data rate and the duration for the grant-less transmission per-CC.

15. The apparatus of claim 14, wherein the transmitter is configured to transmit the grant-less transmission over multiple carriers by:
- transmitting a third portion of the grant-less transmission on a first CC using a first determined data rate and a first determined duration, and
- transmitting a fourth portion of the grant-less transmission on a second CC using a second determined data rate and a second determined duration.

16. The apparatus of claim 10, wherein the transmitter is configured to transmit the grant-less transmission using a single component carrier (CC).

17. The apparatus of claim 10, wherein the access resources comprise a scrambling code or an interleaver and access time.

18. The apparatus of claim 10, wherein the at least one processor is further configured to include an identification of the wireless node with the grant-less transmission.

19. An apparatus for wireless communications by a wireless node, comprising:
- means for receiving, from a base station, a plurality of modulation and coding schemes (MCS) and, for each MCS, a maximum duration constraint or a maximum payload size constraint for grant-less transmission using the MCS;
- means for determining a data rate and duration for a grant-less transmission based on a selected MCS from the plurality of MCS and the maximum duration constraint or the maximum payload size constraint associated with the selected MCS;
- means for selecting access resources to use for the grant-less transmission from a common pool of resources configured to be shared by a plurality of wireless nodes for grant-less transmissions;
- means for transmitting a first portion of the grant-less transmission using the selected access resources, at the determined data rate and for the determined duration; and
- means for requesting a grant for transmitting a second portion of the grant-less transmission when the maximum duration constraint or the maximum payload size constraint is reached.

20. The apparatus of claim 19, wherein the means for determining the data rate comprises:
- means for calculating a transmission power associated with each of one or more of the MCS; and
- means for selecting an MCS that is associated with a calculated transmission power that does not exceed a transmission power used for the grant-less transmission.

21. The apparatus of claim 19, wherein:
the means for determining the duration for the grant-less transmission comprises means for selecting a duration for the grant-less transmission that does not exceed the indicated maximum duration constraint for grant-less transmission associated with the selected MCS.

22. The apparatus of claim 19, wherein:
the means for determining the duration for the grant-less transmission comprises means for determining a duration corresponding to a payload size that does not exceed the indicated maximum payload size constraint for the grant-less transmission using the selected MCS.

23. The apparatus of claim 19, wherein:
the grant-less transmission is transmitted using multiple component carriers (CCs); and
the data rate and the duration for the grant-less transmission are determined per-CC.

24. The apparatus of claim 23, wherein the means for transmitting the grant-less transmission over multiple carriers comprises:
means for transmitting a third portion of the grant-less transmission on a first CC using a first determined data rate and a first determined duration, and
means for transmitting a fourth portion of the grant-less transmission on a second CC using a second determined data rate and a second determined duration.

25. A non-transitory computer readable medium having computer executable code stored thereon for:
receiving, from a base station, a plurality of modulation and coding schemes (MCS) and, for each MCS, a maximum duration constraint or a maximum payload size constraint for grant-less transmission using the MCS;
determining a data rate and duration for a grant-less transmission based on a selected MCS from the plurality of MCS and the maximum duration constraint or the maximum payload size constraint associated with the selected MCS;
selecting access resources to use for the grant-less transmission from a common pool of resources configured to be shared by a plurality of wireless nodes for grant-less transmissions;
transmitting a first portion of the grant-less transmission using the selected access resources, at the determined data rate and for the determined duration; and
when the maximum duration constraint or the maximum payload size constraint is reached, requesting a grant for transmitting a second portion of the grant-less transmission.

26. The non-transitory computer readable medium of claim 25, wherein determining the data rate comprises:
calculating a transmission power associated with each of one or more of the MCS; and
selecting an MCS that is associated with a calculated transmission power that does not exceed a transmission power used for the grant-less transmission.

27. The non-transitory computer readable medium of claim 25, wherein:
determining the duration for the grant-less transmission comprises selecting a duration for the grant-less transmission that does not exceed the indicated maximum duration constraint for grant-less transmission associated with the selected MCS.

28. The non-transitory computer readable medium of claim 25, wherein:
determining the duration for the grant-less transmission comprises determining a duration corresponding to a payload size that does not exceed the indicated maximum payload size constraint for the grant-less transmission using the selected MCS.

29. The non-transitory computer readable medium of claim 25, wherein:
the grant-less transmission is transmitted using multiple component carriers (CCs); and
the data rate and the duration for the grant-less transmission are determined per-CC.

30. The non-transitory computer readable medium of claim 29, wherein transmitting the grant-less transmission over multiple carriers comprises:
transmitting a third portion of the grant-less transmission on a first CC using a first determined data rate and a first determined duration, and
transmitting a fourth portion of the grant-less transmission on a second CC using a second determined data rate and a second determined duration.

\* \* \* \* \*